(12) United States Patent
Hinkel

(10) Patent No.: US 7,353,924 B2
(45) Date of Patent: Apr. 8, 2008

(54) HYDRODYNAMIC TORQUE CONVERTER

(75) Inventor: Rüdiger Hinkel, Röthlein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 185 days.

(21) Appl. No.: 11/314,682

(22) Filed: Dec. 20, 2005

(65) Prior Publication Data

US 2006/0137953 A1    Jun. 29, 2006

(30) Foreign Application Priority Data

Dec. 23, 2004    (DE) .................. 10 2004 062 081

(51) Int. Cl.
*F16D 33/00*    (2006.01)
(52) U.S. Cl. .................. 192/3.29; 60/330; 60/345; 416/197 C
(58) Field of Classification Search .................. 60/330, 60/345; 413/197 C
See application file for complete search history.

(56) References Cited

U.S. PATENT DOCUMENTS

| 4,523,916 A | 6/1985 | Kizler et al. |
| 5,575,363 A | 11/1996 | Dehrmann et al. |

FOREIGN PATENT DOCUMENTS

DE    101 31 768    1/2003

*Primary Examiner*—Rodney H. Bonck
*Assistant Examiner*—Derek D. Knight
(74) *Attorney, Agent, or Firm*—Cohen Pontani Lieberman & Pavane LLP

(57) ABSTRACT

A hydrodynamic torque converter with a pump wheel, a turbine wheel, and a stator, which combine to form a hydrodynamic circuit, where the flow conditions in the hydrodynamic circuit can displace the turbine wheel axially toward the pump wheel when the converter is operating in pull mode and in the opposite direction when operating in push mode, where at least one axial bearing on the drive side of the freewheel and at least one drive-side thrust washer establish a working axial connection between the turbine wheel and a component of the freewheel. The drive-side thrust washer has a stationary element, by which the washer is in axial contact with a first freewheel component, and a pressure-exerting device, which is in working connection with this stationary element, is free to shift position in the axial direction relative to the stationary element, and, as a result of the action of a compensating element, remains in contact with both the drive-side axial bearing and a second freewheel component regardless of the axial position of the turbine wheel with respect to the pump wheel, whereas the stationary element arrives in axial contact with the drive-side axial bearing only after the turbine wheel has come to within a very short axial distance of the pump wheel.

8 Claims, 2 Drawing Sheets

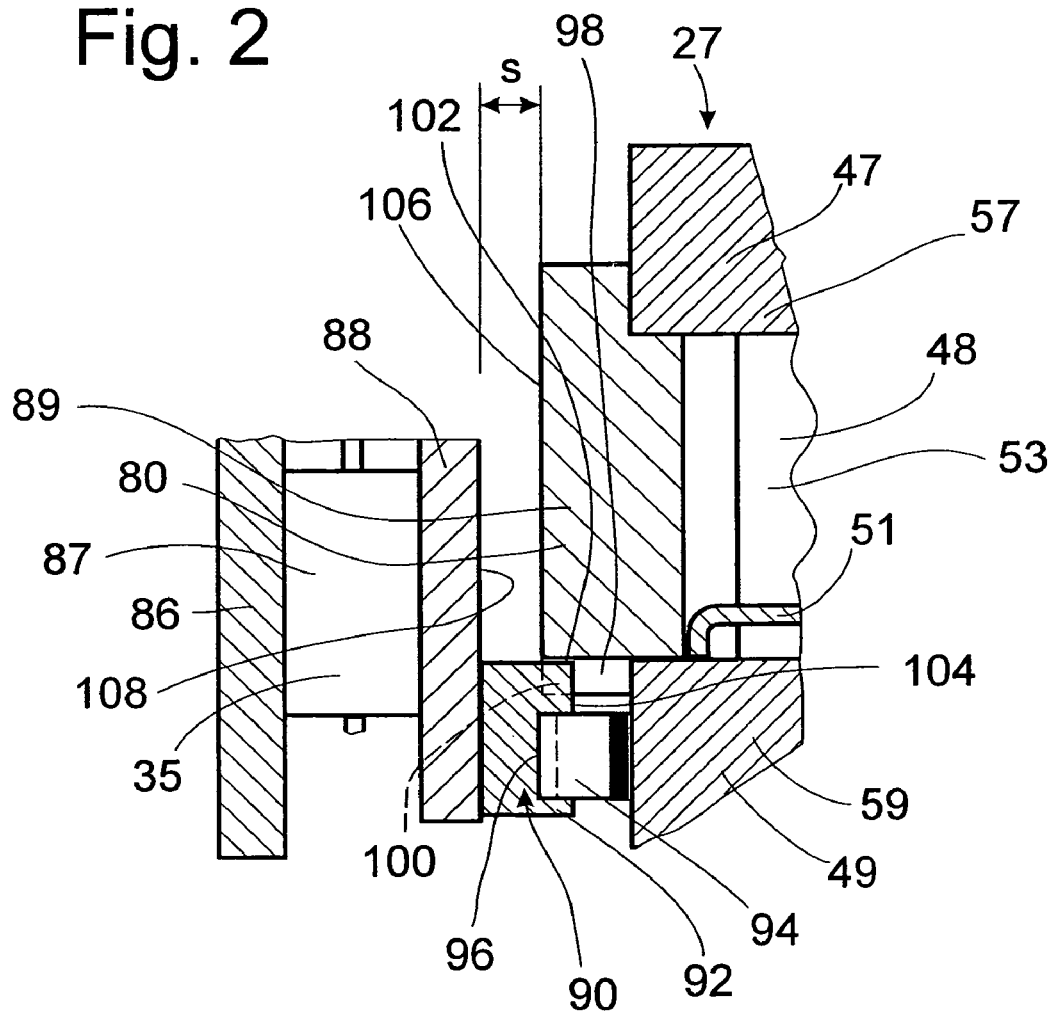

HYDRODYNAMIC TORQUE CONVERTER

BACKGROUND OF THE INVENTION

1. Field of the Invention

The invention pertains to a hydrodynamic torque converter of the type including a pump wheel, a turbine wheel, and a stator which combine to form a hydrodynamic circuit.

2. Description of the Related Art

A hydrodynamic torque converter provided with a pump wheel, a turbine wheel, and a stator, which combine to form a hydrodynamic circuit, is known from DE 101 31 768 A1. The flow conditions in the hydrodynamic circuit can displace the turbine wheel axially toward the pump wheel when the converter is operating in pull mode and in the opposite direction when it is operating in push mode, and at least one axial bearing on the drive side of the freewheel and at least one drive-side thrust washer establish a working axial connection between the turbine wheel and a component of the freewheel. The first freewheel component is formed by an outer body, which holds the stator hub. On the takeoff side, the freewheel is supported against the pump wheel hub by a takeoff-side thrust washer and a takeoff-side axial bearing. The freewheel also has a second component, formed by an inner body, which is centered on the first component by the thrust washers, is free to rotate relative to that first component, and is supported nonrotatably on a part permanently attached to the housing, such as a support shaft.

In freewheels of this type which form part of a stator, especially in cases where the hydrodynamic torque converter is used in working machines such as bucket wheel loaders, the following problem occurs: It can be desirable to introduce shock-like loads such as when the loading bucket is to cut into solid ground or when the loading bucket is to be dumped all at once. These types of shock-like loads are produced by the very rapid closing of at least one clutch in a multi-step reduction gear connected to the torque converter, and they are transmitted as torque surges to the torque converter, where they arrive at the freewheel of the stator. This can lead to malfunctions or even to the failure of the freewheel.

SUMMARY OF THE INVENTION

The invention is based on the task of providing measures for protecting the freewheel from torque surges.

Advantage is taken of the axial displacement of the turbine wheel toward the pump wheel which occurs when a hydrodynamic torque converter is operating in pull mode. Pull mode is present when torque is being transmitted from a drive unit, such as an internal combustion engine, to the housing of the hydrodynamic torque converter and to the pump wheel attached nonrotatably to it, at which point the intermediary action of the fluid circulating within the housing transmits the torque to the turbine wheel, which is attached nonrotatably to a takeoff element such as gearbox input shaft. The axial displacement of the turbine wheel which occurs in pull mode is passed on by the hub of the turbine wheel to a drive-side thrust washer of a freewheel, which forms part of the stator of the hydrodynamic circuit. The axial displacement is then transmitted in turn by this thrust washer to one of the components of the freewheel, preferably its outer body. This outer body serves simultaneously to center another component of the freewheel, preferably the inner body, which is free to move in the circumferential direction with respect to the outer body, this movement being essentially without friction when a transmission element part, preferably in the form of rolling elements, is installed between these two freewheel components.

According to the invention, the axial displacement of the turbine wheel hub in pull mode is used in conjunction with a drive-side thrust washer, which consists of multiple parts. This thrust washer has a stationary element, which is in axial contact with a first freewheel component, preferably the outer body. The thrust washer also has a pressure-exerting device, which is in working connection with the stationary element and which is free to deflect in the axial direction with respect to the stationary element. Regardless of the axial position of the turbine wheel at the moment in question, a compensating element designed as a spring keeps one side of the pressure-exerting device in contact with the turbine wheel hub or with an axial bearing in working connection with that hub and the other side in contact with the assigned freewheel component. The stationary element, however, is installed in such a way that, although it remains continuously in contact with its assigned freewheel component, a gap S remains between it and the turbine wheel hub or an axial bearing assigned to that hub, the width of this gap assuming a maximum when the turbine wheel is the maximum distance away from the pump wheel, whereas the width becomes zero when the turbine wheel has come as close as it can to the pump wheel. In this operating state, therefore, an essentially frictional connection in the circumferential direction is present between the turbine wheel hub or an axial bearing assigned to that hub and the stationary element of the drive-side thrust washer. Although it is true that, as the drive-side axial bearing, for example, approaches the stationary element and the gap S becomes progressively smaller, the compensating element in the pressure-exerting device is elastically deformed and thus becomes axially flatter, the pressure-exerting device is never pressed against its assigned freewheel component with the same strong frictional effect as that which is produced when the axial bearing is in contact with the stationary element. By adapting the compensating element appropriately to the conditions, therefore, the result is that high axial forces are transmitted from the turbine wheel to the freewheel of the stator via the stationary element, even though the pressure-exerting device is keeping the drive-side axial bearing in continuous axial contact with its assigned freewheel component. Because the freewheel component assigned to the stationary element is supported against the pump wheel hub of the housing of the hydrodynamic torque converter by a takeoff-side thrust washer and possibly by a takeoff-side axial bearing, the axial load directed from the turbine wheel to the pump wheel is absorbed by the pump wheel itself. Before such an axial transmission via the stationary element is established, however, the pressure-exerting device with the compensating element acts as a friction device on the freewheel component assigned to the pressure-exerting device. The ability, otherwise present, of the two freewheel components to move relative to each other with little or no friction because of the transmission element part is thus considerably inhibited, and the farther the turbine wheel is deflected toward the pump wheel, the stronger this inhibition becomes. Designing the drive-side thrust washer in this way therefore creates a vibration-damping friction device, which, even though it is of the simplest possible design, is self-adjusting as a function of the axial position of the turbine wheel and thus acts in a situation-dependent manner. To summarize briefly, the stationary element of the drive-side thrust washer serves the classic function of providing axial support for the turbine wheel against its assigned freewheel component, whereas the pressure-exerting device of the drive-side thrust washer serves as a friction device of variable effect and is thus able to provide effective damping of powerful surges of torque introduced to the freewheel.

The two thrust washer parts, i.e., the stationary element and the pressure-exerting device, are connected nonrotatably to each other by an antitwist device. If it is to fulfill its function, this antitwist device must allow the pressure-exerting device to move in the axial direction with respect to the stationary element. The antitwist device is therefore preferably formed by a set of teeth on the stationary element, which engage with an opposing set of teeth on the pressure-exerting device. So that the washer elements have required freedom of axial movement, the two sets of teeth preferably extend in the axial direction.

So that the compensating elements assigned to the compensating device can be accommodated in a minimum of space and can be prevented from falling out, the pressure-exerting device is preferably provided with at least one recess to accept the compensating element, this recess being made in the side of the device which faces its assigned freewheel component.

As soon as the direction in which torque is being transmitted in the hydrodynamic torque converter reverses, that is, as soon as operation in pull mode changes to operation in push mode, the takeoff device, e.g., the gearbox input shaft, turns the turbine wheel. The turbine wheel, which is now turning faster than the pump wheel, causes the fluid in the hydrodynamic circuit to circulate in the opposite direction and thus drives the housing. In push mode, a negative pressure is generated in the area between a bridging clutch and the turbine wheel. As a result, a force is created which pulls the turbine wheel away from the pump wheel in the axial direction. This relieves the load on the compensating element, and the action of the pressure-exerting device is thus almost completely suspended, so that the two freewheel components regain their freedom of relative circumferential movement with almost no friction—a freedom provided in particular by the action of the transmission element part. In push mode, only the stationary element of the drive-side thrust washer has a significant role to fulfill. In that it is connected nonrotatably to a first freewheel component, preferably the outer body of the freewheel, it is able to center the other freewheel component, preferably the inner body of the freewheel.

Of course, the inventive solution is not necessarily limited to the drive-side thrust washer; on the contrary, it can, either alternatively or in addition, be realized on the takeoff-side thrust washer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2 shows an enlarged view of the area of the drive-side thrust washer.

DETAILED DESCRIPTION OF THE PRESENTLY PREFERRED EMBODIMENTS

Figure 1:
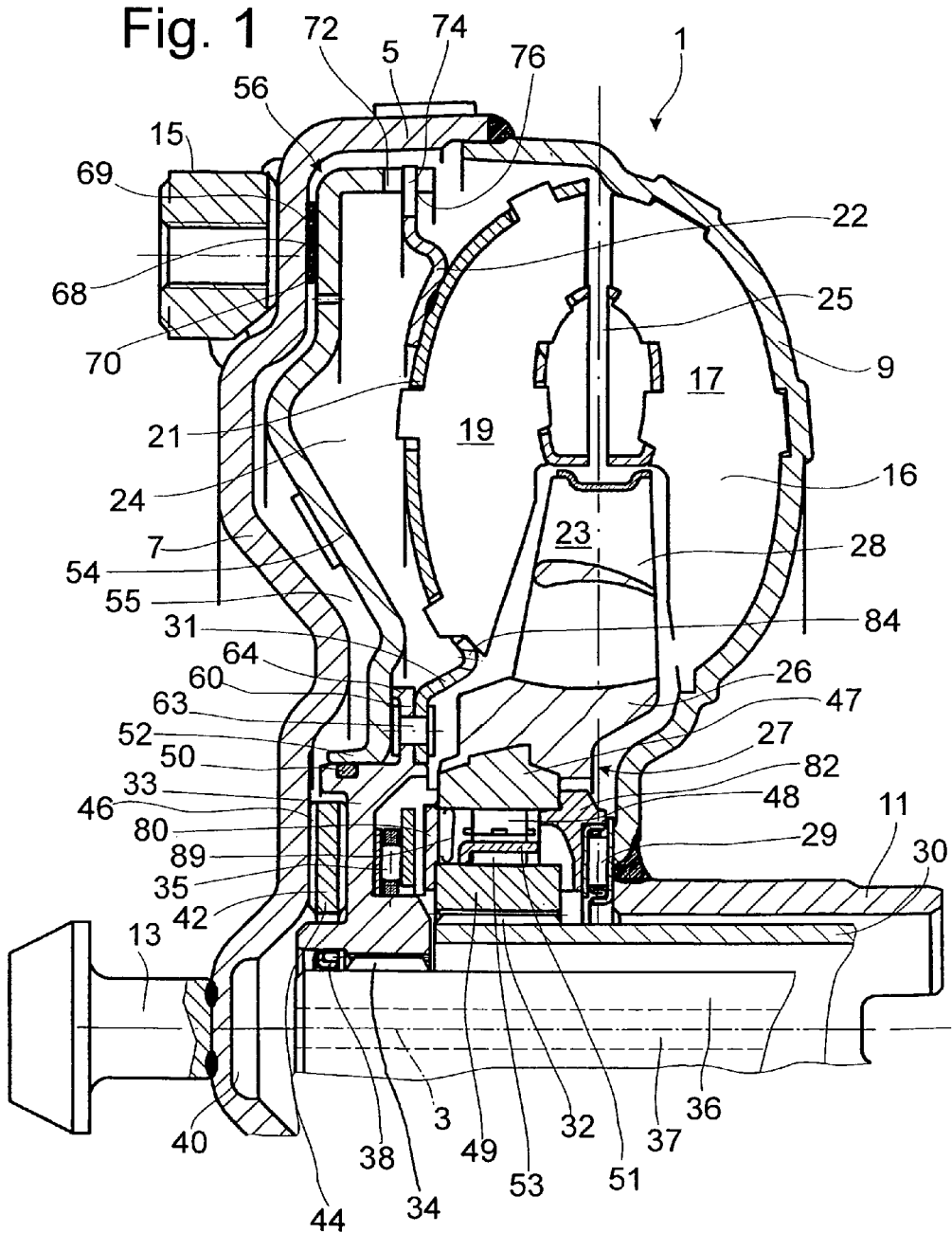
FIG. 1 shows the upper half of a longitudinal cross section through a hydrodynamic torque converter with an axially displaceable turbine wheel, to the drive side of which a thrust washer is assigned.

FIG. 1 shows a hydrodynamic torque converter 1, which is able to rotate around an axis of rotation 3. The hydrodynamic torque converter 1 has a converter housing 5, which has a converter cover 7 on the side facing a drive unit such as an internal combustion engine (not shown). The cover is permanently attached to a pump wheel shell 9, the radially inner part of which merges into a pump wheel hub 11.

To return to the converter cover 7, this has in the radially inner area a bearing journal 13, which is mounted on an element of the drive unit, such as a crankshaft, to center the converter housing 5 on the drive side. The mounting is conventional and is therefore not explained in detail. In addition, the converter cover 7 has a fastening mount 15, which usually serves to fasten the converter housing 5 to the drive unit, preferably by way of a flexplate (not shown). FIG. 1 of U.S. Pat. No. 4,523,916, which is incorporated herein by reference, shows the way in which the bearing journal of a torque converter is mounted in a crankshaft of a drive unit and of the way in which the torque converter is connected by way of a flexplate to the crankshaft.

The previously mentioned pump wheel shell 9 and the pump wheel vanes 16 form together a pump wheel 17, which works together with a turbine wheel 19, equipped with a turbine wheel shell 21 and turbine wheel vanes 22. Pump wheel 17, turbine wheel 19, and stator 23 form a hydrodynamic circuit 24, known in and of itself, which encloses an internal torus 25.

The stator 23 has stator vanes 28, which are carried by a hub 26, which is mounted on a freewheel 27. The latter, as can be seen more clearly FIG. 2, has a first freewheel component 47 in the form of an essentially ring-shaped outer body 57, a transmission element part 48 with a plurality of transmission elements 53, which are positioned by an element cage 51, and a second freewheel component 49 in the form of an essentially ring-shaped inner body 59. The centering between the outer body 57 and the inner body 59 is accomplished on a drive-side thrust washer 80 as well as on a takeoff-side thrust washer 82.

The drive-side thrust washer 80 consists of several parts, namely, of a stationary element 89, which takes over the centering function between the outer body 57 and the inner body 59, and a pressure-exerting device 90, which is designed as a thrust ring 92 with a plurality of recesses 96, each of which holds a compensating element 94 in the form of a spring, these recesses being provided on the axial side 104 of the ring facing the inner body 59 and arranged at predetermined circumferential distances from each other. The compensating elements 94 project toward the inner body 59 beyond the axial side 104 of the pressure-exerting device 90. The ends of the compensating elements which face away from the pressure-exerting device 90 thus come to rest against the inner body 59.

On the radial side facing the pressure-exerting device 90, the stationary element 89 has a set of teeth 98, which cooperates with an opposing set of teeth 100 on the pressure-exerting device 90 to form an antitwist device 102. The antitwist device prevents the stationary element 89 and the pressure-exerting device 90 from rotating with respect to each other but gives the stationary element 89 and the pressure-exerting device 90 a certain freedom of relative axial movement. This freedom is necessary when flow processes in the hydrodynamic circuit 24, to be discussed in detail further below, move the turbine wheel 19 axially with respect to the pump wheel 17 and the stator 27. As a result of this movement, the turbine wheel hub 33, which is connected to the turbine wheel shell 21 by the base 31 of the shell, and a drive-side axial bearing 35, which is supported against the hub, also shift in the axial direction. FIG. 2 shows the position which the drive-side axial bearing 35 occupies when the turbine wheel 19 is at its maximum axial distance from the pump wheel 17 and accordingly a gap S is present between the axial side 106 of the stationary element 89 facing the drive-side axial bearing 35 and the support surface 108 of the drive-side axial bearing 35. Under these operating conditions, therefore, an effective axial connection between the freewheel 27 and the drive-side axial bearing 35 exists only through the pressure-exerting device 90. Only after the turbine wheel 19 has approached the pump wheel 17 so closely that the drive-side axial bearing 35 rests against the stationary element 89 is there support between the drive-side axial bearing 35 and the freewheel 27, specifically via the outer body 57 of the freewheel. The compensating element 94 in the pressure-exerting device 90 is then deformed more strongly in the axial direction than shown in FIG. 2, but it still projects axially beyond the axial side 104 of the pressure-exerting device 90 and is thus able to prevent contact between the axial side 104 and the inner body 59 even after the gap S has completely disappeared.

On the side facing away from the drive-side axial bearing 35, the outer body 57 of the freewheel 27 is supported axially against the pump wheel hub 11 by a takeoff-side thrust washer 82 and a takeoff-side axial bearing 29. The inner body 59, however, is mounted nonrotatably but with freedom of axial movement by way of a set of teeth 32 on a support shaft 30, which is located radially inside the pump wheel hub 11. The support shaft 30, which is hollow, encloses in turn a gearbox input shaft 36, which is provided with a central bore 37 for the passage of hydraulic fluid. The gearbox input shaft 36 has a set of teeth 34 by which it holds the turbine wheel hub 33 in such a way that the hub cannot rotate but can shift position axially. One side of the turbine wheel hub 33 is supported on the converter cover 7 by way of an axial bearing 44. The other side of the hub serves as a contact surface for the previously mentioned drive-side axial bearing 35 and also supports the freewheel 27 by way of the drive-side thrust washer 80. As shown more clearly in FIG. 2, the axial bearing 35 is designed with a drive-side axial contact ring 86, with a rolling element device 87, and with a takeoff-side axial contact ring 88. Radially on the inside, the turbine wheel hub 33 is sealed off against the transmission input shaft 36 by a seal 38.

The previously mentioned central bore 37 in the gearbox input shaft 36 serves to supply the hydrodynamic circuit 24 with fluid and thus to apply pressure to a bridging clutch 56, to be explained further below, for which purpose a connection to a control device and a reservoir of hydraulic fluid are required. Neither the control device nor the hydraulic fluid reservoir is shown in the drawing, but reference can be made for this purpose by way of example to FIG. 1 of U.S. Pat. No. 5,575,363, which is incorporated herein by reference.

Hydraulic fluid which has entered through the central bore 37 in the transmission input shaft 36 arrives in a transition space 40, and from there it passes through supply channels 46 of the axial bearing 44, serving as a flow passage 42, in the radially outward direction to a chamber 55, located axially between the converter cover 7 and the piston 54 of the previously mentioned bridging clutch 56. The piston 54 is centered on the converter cover 7, and the side of this piston which faces away from the chamber 55 faces the hydrodynamic circuit 24. Depending on the pressure relationships in the hydrodynamic circuit 24 and in the chamber 55, the piston can be moved between two different limit positions, which will be discussed further below. The base 52 of the piston 54 is supported on the turbine wheel hub 33 and is thus able to slide axially. A piston seal 50 recessed into the turbine wheel hub 33 performs a sealing function with respect to the piston base 52. In its radially inner area, the piston 54 is attached to a holding device 60 by tangential leaf springs (not shown) and riveted joints (not shown). The holding device is an integral part of the turbine wheel hub 33 and is connected by additional riveted joints 63 to the base 31 of the turbine wheel 19.

The piston 54 is provided on its outer circumference with a plurality of openings 72 distributed around the circumference which are connected to the opposing tabs 74 of an antitwist device 76. The latter is attached in turn to the turbine wheel shell 21. It remains to be noted that the openings 72/opposing tabs 74 connect the piston 54 nonrotatably to the antitwist protection device 76 while allowing freedom of axial movement.

In the radially outer area, the piston 54 is provided on the side facing the converter cover 7 with a friction lining 68, which surrounds the axis of rotation 3 in a ring-like manner. On the side facing away from the piston 54, to be called the friction area 69 in the following, this friction lining can be brought into nonpositive engagement with an opposing friction area 70 provided on the converter cover 7, provided that the pressure in the hydrodynamic circuit 24 is greater than that in the chamber 55 on the opposite side of the piston 54.

The first of the previously mentioned limit positions of the piston 54 is reached when the friction area 69 of the friction lining 68 has come to rest nonpositively against the opposing friction area 70. The second limit position is assumed when the pressure in the chamber 55 is greater than that in the hydrodynamic circuit 24 and the piston 54 accordingly is shifted axially against the action of the tangential leaf springs, which are trying to push the piston toward the converter cover 7, until it rests against a stop 64 of the holding device 60.

To return to the turbine wheel 19, when the hydrodynamic torque converter 1 is operating in pull mode, that is, when torque is being introduced by the drive unit (not shown) to the converter housing 5 and thus to the pump wheel 17, the turbine wheel is driven by the pump wheel. Because of the fluid circulation generated in the hydrodynamic circuit 24, a negative pressure is created axially between the pump wheel 17 and the turbine wheel 19; this negative pressure causes the turbine wheel 19 to be shifted toward the pump wheel 17. As the turbine wheel 19 is being shifted, its hub 33 carries the drive-side axial bearing 35 along with it. The radially inner part of the support surface 108 on the bearing's takeoff-side axial contact ring 88 shifts the thrust ring 92 of the pressure-exerting device 90 toward the second freewheel component 49 of the freewheel 27, thus deforming the compensating element 94. Although it is true that the axial force exerted by the thrust ring 92 on the second freewheel component 49 thus increases, it is merely the frictional action of this second freewheel component 49 with respect to the first freewheel component 47 which is increased; in other words, no high axial forces are actually being absorbed by this route. It is the stationary element 89 of the drive-side thrust washer 80 which makes it possible for the freewheel 27 to absorb high forces, but this stationary element 89 does not go into action until after the turbine wheel hub 33 of the turbine wheel 19 and the drive-side axial bearing 35 have come so close to the freewheel 27 that the gap S shown in FIG. 2 no longer exists, and the support surface 108 of the takeoff-side axial contact ring 88 of the drive-side axial bearing 35 has arrived in direct contact with the axial side 106 of the stationary element 89. Axial forces to be transmitted from the turbine wheel 19 via the drive-side axial bearing 35 to the stationary element 89 are then transmitted from the stationary element 89 directly via the first freewheel component 47 to the takeoff-side thrust washer 82 and from this via the takeoff-side axial bearing 29 to the pump wheel hub 11. The pressure-exerting device 90 in this operating mode is much closer to its assigned second freewheel component 49 than is shown in FIG. 2. As this approach movement occurs, the size of the gap S decreases simultaneously as a result of the axial displacement of the thrust ring 92 along the two sets of teeth 98, 100, i.e., in the area of the radial dimension of the antitwist device 102.

Torque surges are introduced into the hydrodynamic torque converter 1 and act there on the freewheel 27 precisely during operation in pull mode, during which the turbine wheel 19 is already being displaced axially toward the pump wheel 17 in any case. With the help of the pressure-exerting device 90, advantage is taken of the axial displacement to operate the drive-side thrust washer 80 as if it were an adjustable friction device. Torque surges at the freewheel 27 can therefore be filtered out at least partially and are therefore unable to damage the freewheel.

When operation reverses to push mode, the turbine wheel 19 rotates at a higher speed than the pump wheel 17 and thus drives the converter housing 5. A negative pressure now develops axially between the piston 54 of the bridging clutch 56 and the turbine wheel 19; this negative pressure causes the turbine wheel 19 to shift toward the bridging clutch 56, and thus the turbine hub 33 and the drive-side axial bearing 35 move away from the drive-side thrust washer 80. As a result, the gap S increases to its maximum width, shown in FIG. 2, and simultaneously the friction which the compensating element 94 of the pressure-exerting device 90 exerts on the second freewheel component 49 is decreased to a minimum with respect to the first freewheel component 47. This is advantageous, because, during push mode, there is no need to expect any torque surges, which could possibly damage the freewheel 27.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic torque converter comprising:
   a pump wheel;
   a turbine wheel which shifts axially toward the pump wheel when the converter is operating in a pull mode and away from the converter when the converter is operating in a push mode;
   a stator located between the pump wheel and the turbine wheel;
   a freewheel on which the stator is mounted, the freewheel comprising a first freewheel component and a second freewheel component which lies radially inside the first freewheel component;
   a drive-side axial bearing between the turbine wheel and the freewheel; and
   a drive-side thrust washer between the drive-side axial bearing and the freewheel, the thrust washer comprising a stationary element in axial contact with the first freewheel component, the stationary element contacting the axial bearing to limit axial travel of the turbine wheel toward the pump wheel, and a pressure exerting device which is fixed against rotation but free to move axially with respect to the stationary element, the pressure exerting device comprising a compensating element which causes the pressure exerting device to maintain axial contact with both the drive-side axial bearing and the second freewheel component regardless of the position of the turbine wheel with respect to the pump wheel.

2. The hydrodynamic torque converter of claim 1 comprising an anti-twist device by which the pressure exerting device is mounted on the stationary element with freedom to move axially.

3. The hydrodynamic torque converter of claim 2 wherein the anti-twist device comprises teeth on the pressure exerting device and teeth on the stationary element which engage the teeth on the pressure exerting device.

4. The hydrodynamic torque converter of claim 1 wherein the pressure exerting device comprises a thrust ring having a recess facing the second freewheel component, the compensating element being received in the recess and extending axially beyond the thrust ring, at least until the stationary element makes contact with the drive-side axial bearing.

5. The hydrodynamic torque converter of claim 1 wherein the drive-side axial bearing supports the first freewheel component when the stationary component contacts the drive-side axial bearing.

6. The hydrodynamic torque converter of claim 1 wherein the second freewheel component is connected to the first freewheel component so that the freewheel components can be circumferentially deflected relative to each other, the second freewheel component being radially centered with respect to the first freewheel component by the stationary element.

7. The hydrodynamic torque converter of claim 1 wherein the freewheel comprises a transmission element part which provides a friction-free working connection between the first and second freewheel components.

8. The hydrodynamic torque converter of claim 1 wherein the drive-side axial bearing comprises a drive-side axial contact ring, a take-off side axial contact ring, and a rolling element device therebetween, the take-off side axial contact ring having a support surface in contact with the pressure exerting device regardless of the position of the turbine wheel with respect to the pump wheel, said support surface contacting said stationary element to limit axial travel of the turbine wheel toward the pump wheel.

* * * * *